June 7, 1938.    P. F. ROSSMANN    2,119,650
MOTOR VEHICLE BRAKE
Filed Jan. 10, 1935
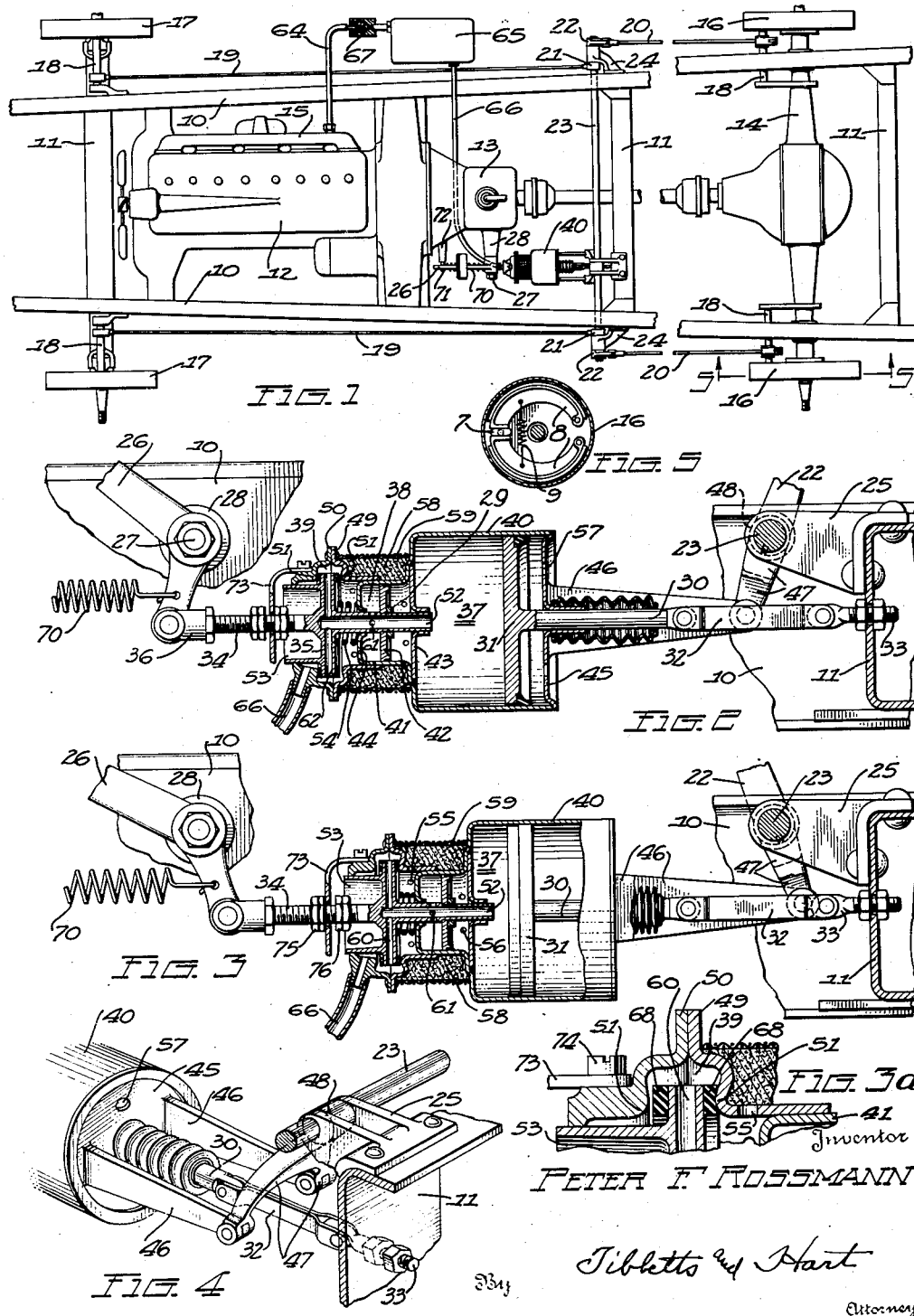

Patented June 7, 1938

2,119,650

UNITED STATES PATENT OFFICE 2,119,650

MOTOR VEHICLE BRAKE

Peter F. Rossmann, Detroit, Mich., assignor to Packard Motor Car Company, Detroit, Mich., a corporation of Michigan Application January 10, 1935, Serial No. 1,262

11 Claims. (Cl. 188—152)

This invention relates to actuator means and more particularly to actuator means employed to operate mechanism forming a part of a motor vehicle.

An object of the invention is to provide a compact structure which is operated by either combined physical and power created force or entirely by physical effort to actuate a mechanism.

Another object of the invention is to provide a linkage actuator for motor vehicle mechanism which includes power means, control valve means, and physical reaction means.

A further object of the invention is to provide a unitary actuator means, operable by a manual and power created force, in which a casing, a valve structure and physical reaction means are interdependent and interacting.

Still another object of the invention is to provide actuator means operable through the effect of physical and power applied forces in which physical reaction means is power operated.

Other objects of the invention will appear from the following description taken in connection with the drawing, which forms a part of this specification, and in which:

Fig. 1 is a plan view of a motor vehicle chassis having my invention associated therewith for operating brake mechanism.

Fig. 2 is a vertical sectional view of the actuator means in ineffective position.

Fig. 3 is a similar vertical sectional view of the actuator means in effective brake applying position.

Fig. 3a is an enlarged fragmentary portion of the valve means shown in Fig. 2.

Fig. 4 is a perspective view showing a fragment of the actuator means attached to the chassis and the brake mechanism cross rod.

Fig. 5 is a sectional view taken on line 5—5 of Fig. 1 showing the brake mechanism in one of the brake drums.

Referring now to the drawing by characters of reference, a motor vehicle main frame is illustrated as comprised of side sills 10 and cross sill members 11. A power unit, consisting of an internal combustion engine 12 and a transmission unit 13, is supported upon the frame, and suitable driving means extends rearwardly from the transmisison unit to actuate driving mechanism contained within the rear axle structure 14. The engine is provided with the usual intake manifold 15 through which fuel charges are moved into the engine cylinders.

Brake drums 16 are associated with the rear driven wheels (not shown) and brake drums 17 are associated with the front steering wheels (not shown). In each drum is arranged a pair of pivotally mounted segmental brake shoes 8 normally held in released position by spring 9. Between the free ends of the pairs of shoes are actuator cams 7 fixed on control rods 18 which are rotated by front and rear brake rods 19 and 20 connected respectively to arms 21 and 22 fixed on cross shaft 23. This cross shaft is carried by suitable bracket means 24 fixed to the side sills 10 and by a bracket 25 fixed to the cross frame brace member 11 extending adjacent thereto.

In order to actuate the cross rod or a similar regulating mechanism, I associate therewith means which is responsive to physically created force or to force created physically and by power. Foot lever 26 is rotatably mounted on shaft 27 fixed in a bearing 28 extending from one side of the transmission casing. The rod 30 of a power piston 31 is pivotally connected by link 32 with an anchor eye bolt 33 fixed to the intermediate frame cross member adjacent the brake cross rod. The threaded stem 34 of a valve 35 is screwed into a member 36 which is pivotally connected to the lower end of lever 26. The valve stem and piston rod are preferably arranged so that they extend substantially in axial alignment.

Associated with the valve, power piston and brake cross rod is a casing forming aligned chambers 37, 38, and 39. Chambers 37 and 38 are defined by a two diameter cylindrical structure, the larger diameter portion 40 of which contains the power piston and the smaller diameter portion 41 of which contains a physical reaction piston 42. Chambers 37 and 38 are separated by a partition 43 suitably secured in the cylindrical structure and the other end of the reaction chamber is defined by the end wall 44 of the cylindrical structure. An end wall 45 is suitably fixed to the cylindrical structure and defines the rear end of the power chamber. Extensions 46 project from the wall 45 and are pivotally connected to arms 47 depending from a hub 48 fixed on the brake cross shaft. The valve is contained in chamber 39 formed by a pair of shells 49 and 50, the shell 49 telescoping the reduced end of the cylindrical structure and being suitably secured thereon. The adjacent edges of the shells are secured together and the adjacent portions are of larger diameter forming annular shoulders 51 serving as valve seats.

The valve is formed with a stem 52 which extends through axial openings in the wall 44 and the partition wall 43 and has a close sliding fit with suitable bearings extending from such walls.

The valve also has a circular flange portion 53 telescoping a portion of the stem 34 which has a close sliding fit with the open end wall of the shell 50. Coil spring 54 encircles the stem 52 in the chamber 39 and exerts a light pressure urging the valve structure toward the shoulder 51 on the shell 50, such spring serves only to insure that the valve will engage shoulder 51 on the shell 50 when foot pressure is released from pedal 26. The physical reaction piston in the chamber 38 is suitably held axially against a shoulder on the valve stem 52 by a nut 29 screwed on the stem.

The shell 49 has openings 55 therethrough connecting the chamber 39 with atmosphere, and the reduced diameter cylindrical structure has openings 56 therein, adjacent the partition, connecting the physical reaction chamber with atmosphere. The cylinder wall 45 has an opening 57 therethrough connecting the power cylinder with atmosphere. A cylinder of filtering material 58 covers the openings 55 and 56 and is held around the reduced portion of the cylindrical structure and the shell 49 by a circular screw 59.

The valve proper is circular in outline and is formed with radially extending passages 60 open to the enlarged portion of chamber 39 exteriorly of the shoulders 51. The stem 52 is hollow and is open to the power chamber at its free end and to the radial passages in the valve at its other end. There are also openings 61 through the stem portion in the physical reaction chamber in advance of the piston 42. The valve and stem 52 thus establish communication between the three chambers and such chambers have openings connecting them with atmosphere.

A pressure lower than atmospheric pressure is created in the chambers by suitable means, such as by connection with the intake manifold of the engine. To this end a conduit 64 leads from the intake manifold 15 to a reserve tank 65 and a conduit 66 leads from such tank to the chamber 39. In the conduit 64 is a one-way valve 67 which opens only when there is a pressure below atmospheric in the fuel inlet manifold.

The valve flange 53 seals the front end of the shell 50 and the valve serves to selectively seal off the major portion of the chamber 39 from the conduit 66 or from atmosphere. Rubber rings 68 are fixed around the front and rear faces of the valve adjacent the periphery in a relation to engage with the shoulders 51. These rubber rings are preferably relatively soft and of sufficient thickness so that the full movement of the valve between extreme positions of reciprocation is relatively small. When the valve ring engages the shoulder 51 on the shell 50 then the conduit 66 is shut off from the major portion of the chamber 39 and the other ring is spaced from the shoulder 51 on the shell 49 opening the major portion of the chamber to the air ports 55. When the valve ring engages the shoulder 51 on the shell 49 communication between the major portion of the chamber 39 and the ports 55 is shut off and the chamber communicates with the conduit 66.

In order that the brake mechanism actuator means will normally be located in ineffective position, a coil spring 70 is attached at one end to the lever 29 and at the other end to a shaft 71 extending from a boss 72 on the transmission casing 13. This action of spring 70 is further assisted by the spring release means 9 in the brake mechanism.

Extreme compression of the valve rings against the shoulders 51 is prevented by suitable stop means including an angular finger 73 secured to the shell 50 by a screw 74. This finger extends across the end of the shell 50 and is formed with an opening through which the threaded valve stem 34 extends. Nuts 75 and 76 are threaded on the stem and are spaced to engage the finger to limit the degree of valve ring compression upon engaging the shoulders 51.

The casing forming the power chamber, the physical reaction chamber and the valve chamber is an integral unit and is connected to operate the cross shaft of the brake mechanism. The valve structure associated with the casing is connected with the foot lever 26. Such valve structure and casing have a small relative axial movement but otherwise they form a direct actuator link between the levers 29 and 47 which are connected to move directly with the foot lever 26 and the shaft 23 respectively. Actuation of the cross shaft is obtained through force exerted on the casing and such force is obtained by combined physical and power efforts, or entirely by physical effort when the power fails.

The actuator means as shown in Fig. 2 is in the position taken when the brake mechanism is entirely released, and in Fig. 3 the actuator means is shown in the position taken when the brake mechanism is fully applied. To apply the brake mechanism, the foot pedal 26 is rocked counterclockwise, as viewed in Figs. 2 and 3, against the action of spring 70 and the releasing springs 9 in the brake mechanism. Such movement of the lever is transmitted to the valve structure forcing the valve against shoulder 51 on the shell 49 and thereby closing the major portion of the valve chamber to the ports 55 and opening the same to the vacuum conduit 66. The radial passages 60 and the hollow valve stem 52 are thus open to the conduit 66 so that pressure in chambers 37 and 38 at the front of the pistons therein is less than atmospheric pressure. Because of the reduced pressure in the power cylinder, atmospheric pressure acting against the exterior front end of the chamber and against the partition exposed to chamber 38 will move the cylinder toward the right which is rearwardly of the vehicle. This casing movement rocks the arms 47 and the brake cross shaft 48 in a counter-clockwise direction to apply the brakes.

To increase the brake application a continued physical force requisite to hold the valve against the shoulder 51 on shell 49 as the casing is moved by power toward the rear of the vehicle is required. If the following movement of the valve relative to the casing is not maintained, then the valve will open and expose the chambers 37 and 38 to atmosphere, thus equalizing pressures on each side of the pistons and thereby allowing the brake return springs to move the casing to the left. Of course if the operator's foot holds the pedal lever stationary, then the valve will close again but only momentarily but it will open again as soon as the power means is effective. It is thus seen that to increase the application of the brakes, there must be a continuing pressure on the foot pedal and that any given brake application will be maintained by holding the foot pedal in a fixed operative position.

Air in the portion of chamber 38 between the piston 42 and the partition 43 exerts atmospheric pressure therein. As before stated it acts to create a force against the partition serving to assist suction in chamber 37 in moving the casing to the right when the valve seats against the shoulder 51 on the shell 49. It also creates a force assisting suction in the chamber to move the piston 42 toward the left, and as the valve is fixed axially on the valve stem unseating of the valve is thus accomplished unless foot pressure is sufficient to hold the valve seated. When the valve is closed, the portion of chamber 38 on the left of the piston 42 is connected with conduit 66, so that the pressure therein is lower than on the other side of the piston and this pressure differential provides power means for unseating the valve unless overcome by pressure by the operator on the foot pedal. It is thus seen that physical reaction means operated by power forms a part of the actuator means. When the operator holds the foot pedal in a given position the casing will move toward the left, as previously described, and the valve will seat against the shoulder 51 on shell 49 but as soon as power is effective this physical reaction means will unseat the valve unless foot pressure is increased sufficient to overcome it. Such foot pressure must therefore be applied along with the power developed pressure to apply the brake mechanism. The ratio of foot pressure required relative to power developed pressure is determined by the area of piston 42 relative to piston 31.

When pressure on the foot pedal is being relieved or released, the power means is ineffective and the brake mechanism release springs will move the casing to the left and the spring 70 will move the foot lever in a clockwise direction. When the actuator means is in inoperative position the spring 54 will assure seating of the valve against shoulder 51 on shell 50 to shut off the conduit 66 so that pressure lower than atmosphere is stored for use when the engine is not running, or the suction created when the engine is running is limited. The spring 70 will normally perform the function of holding the valve in the closed position just mentioned and spring 54 is required only as an accessory for this purpose. While the valve acts directly to assist in moving the casing in opposite directions, its function in this respect is somewhat relieved by engagement of the nuts 75 and 76 with the finger 73 fixed to the casing, however the valve engagement is effective prior to engagement of the nuts with the finger.

When the power means is ineffective the actuator means provides a unitary structure or link which can be moved to brake applying position by foot pressure, the valve under such circumstance moving the casing.

It will be seen that the actuator means forms a substantially rigid linkage operable to apply the brake mechanism. Such linkage is compact and contains few parts. Physical reaction means is incorporated in the actuator means and is power operated. The valve portion of the means cooperates with the other elements, and besides controlling the power means it serves to effect operation of the power cylinder.

Although the invention has been described in connection with specific embodiments, the principles involved are susceptible of numerous other applications which will readily occur to persons skilled in the art. The invention is therefore to be limited only as indicated by the scope of the appended claims.

What is claimed is:

1. In an actuator mechanism, a rigid casing having three aligned and separated chambers therein, means in the casing forming a passage adapted to open to the three separated chambers, a fixed piston in one end chamber, fluid actuated means operable to create physical reaction in the intermediate chamber, a valve movable a limited extent in the other end chamber, fluid pressure means leading to the valve chamber, said valve shutting off or allowing the passage of fluid in the passage, and physically operable means connected to actuate said casing.

2. In an actuator mechanism, a unitary rigid casing composed of a two diameter cylindrical shell and a pair of shells forming a valve chamber fixed to said smaller diameter shell portion, a partition in the cylindrical two diameter shell separating it into a power chamber and a physical reaction chamber, a fixed piston in the power chamber, a piston in the reaction chamber, fluid pressure means connected with the valve chamber, a valve movable a limited extent in the valve chamber, said valve connecting one end of the other chambers with the valve chamber and having the reaction piston fixed thereto, and physically operative means connected with said valve.

3. In a motor vehicle, the combination with a brake control mechanism including a cross rod and spring releasing means, and an engine intake manifold, of actuator means for said mechanism comprising arm means fixed on the cross rod, a pivoted foot pedal, a casing intermediate the arm means and the pedal fixed to rock the arm means, said casing having three separated chambers therein open to atmosphere a fixed piston in one end chamber, a valve movable a limited extent in the other end chamber and operatively connected with said pedal, said valve having passage means for establishing communication between the valve chamber and the other two chambers, a physical reaction piston in the intermediate chamber fixed on the valve, and a connection between the engine manifold and the valve chamber.

4. In a motor vehicle, the combination with brake control mechanism including a cross rod and spring releasing means, and an engine intake manifold, of actuator means for the brake control mechanism comprising arm means fixed to the brake cross rod, a pivoted physical operable part, a casing operatively connected to rock said arm means and apply the brake mechanism against the action of the spring releasing means, said casing having three aligned separated chambers therein each open at one end to atmosphere, a fixed piston in the chamber adjacent the portion of the casing connected with the arm means, a valve movable a limited extent in the chamber at the end of the casing opposite the fixed piston, means operatively connecting the valve with the physical operable part, a connection between the engine intake manifold and the valve chamber, a valve stem extending into the intermediate physical reaction chamber and the fixed piston chamber, and a piston in the intermediate chamber fixed on the valve stem, said valve and stem having passage means connecting the ends of the reaction chamber and fixed piston chamber on the opposite sides of the pistons to the ends open to atmosphere with the valve chamber and said valve controlling connection of its chamber with atmosphere or the intake manifold.

5. In a motor vehicle, the combination with brake control mechanism including a cross rod and spring releasing means, and an engine intake manifold, of actuator means for the brake control mechanism comprising arm means fixed to the brake cross rod, a pivoted physical operable part, a casing operatively connected to said arm means to apply the brake mechanism against the action of the spring releasing means, said casing having a pair of aligned chambers therein each open at one end to atmosphere, a fixed piston in the chamber adjacent the portion of the casing connected with the arm means, a valve movable a limited extent in the other chamber, a pair of spaced annular shoulders in the valve chamber, a valve stem operatively connected with the physical operable part, a connection between the engine intake manifold and the valve chamber, said valve being movable a limited extent in its chamber to engage shoulders for opening or shutting off the chamber to atmosphere or to the connection with the intake manifold, said valve including passage means extending from its chamber to the end of the fixed piston chamber opposite the end open to atmosphere, and means associated with said valve stem and said casing limiting the movement of the valve relative to the casing.

6. In a motor vehicle, the combination with brake control mechanism including a cross rod and spring releasing means, and an intake manifold, of actuator means for the brake control mechanism comprising arm means fixed to the brake cross rod, a pivoted physical operable part, a casing operatively connected at one end to rock said arm means and apply the brake mechanism against the action of the spring releasing means, said casing having three aligned chambers separated by a pair of transversely extending walls and being open at one end to atmosphere, said transversely extending walls having axially aligned bearings, a fixed piston in the chamber adjacent the end of the casing connected to the arm means, a valve movable a limited extent in the chamber at the end of the casing remote from the fixed piston chamber, means operatively connecting the valve with the physical operable part, a connection between the engine intake manifold and the valve chamber, a valve stem extending through the bearings in the transversely extending walls of the casing, and a piston in the intermediate chamber fixed on the valve stem, said valve and stem having passage means leading from the valve chamber to the ends of the piston chambers remote from the ends open to atmosphere and said valve controlling the connection of its chamber with atmosphere or the connection with the intake manifold.

7. In a motor vehicle, the combination with brake control mechanism including a cross rod and spring releasing means, and an intake manifold, of actuator means for the brake control mechanism comprising arm means fixed to the brake cross rod, a pivoted physical operable part, a casing operatively connected to rock said arm means and apply the brake mechanism against the action of the spring releasing means, said casing having three aligned separated chambers therein each open at one end to atmosphere, a fixed piston in the chamber adjacent the portion of the casing connected with the arm means, a connection between the chamber at the end of the casing remote from the fixed piston chamber with the intake manifold, a valve movable a limited extent in the chamber connected with the intake manifold, said valve having rubber ring means on its marginal faces adapted to seat against the casing to seal the chamber from atmosphere or the connection with the intake manifold, means operatively connecting the valve with the physical operable part, a valve stem extending into the intermediate physical reaction chamber and the fixed piston chamber, and a piston in the intermediate reaction chamber fixed on the valve stem, said valve and stem having passage means connecting the reaction chamber and the fixed piston chamber at the ends opposite those open to atmosphere with the valve chamber.

8. In a motor vehicle, the combination with brake control mechanism including a cross rod and spring releasing means, and an intake manifold, of actuator means for the brake control mechanism comprising arm means fixed to the brake cross rod, a pivoted physical operable part, a casing operatively connected to rock said arm means and apply the brake mechanism against the action of the spring releasing means, said casing having three aligned separated chambers therein each open at one end to atmosphere, a fixed piston in the chamber adjacent the portion of the casing connected with the arm means, a valve movable a limited extent in the chamber at the end of the casing opposite the fixed piston, stems extending from opposite faces of the valve, means connecting one of the stems with the physical operable part, the other valve stem extending through the intermediate chamber and into the fixed piston chamber, a connection between the engine intake manifold and the valve chamber, and a piston in the intermediate chamber fixed on the valve stem, said valve and the valve stem extending through the intermediate chamber and into the fixed piston chamber having passage means therein connecting said chambers on the opposite side of the pistons from the side open to atmosphere with said valve chamber.

9. In a motor vehicle, the combination with brake control mechanism including a cross rod and spring releasing means, and an intake manifold, of actuator means for the brake control mechanism comprising arm means fixed to the brake cross rod, a pivoted physical operable part, a casing operatively connected to rock said arm means and apply the brake mechanism against the action of the spring releasing means, said casing having three aligned separated chambers therein each open at one end to atmosphere, a fixed piston in the chamber adjacent the portion of the casing connected with the arm means, a valve movable a limited extent in the chamber at the end of the casing opposite the fixed piston chamber, means operatively connecting the valve with the physical operable part, a connection between the engine intake manifold and the valve chamber, a valve stem extending through the intermediate chamber and into the fixed piston chamber, and a piston in the intermediate chamber fixed on the valve stem, said valve having radial passages therein opening through the periphery and communicating with a passage extending through the valve stem, said stem having openings communicating with said intermediate chamber on the side of the piston therein opposite the side open to atmosphere.

10. In a motor vehicle, the combination with brake control mechanism including a cross rod and spring releasing means, and an intake manifold, of actuator means for the brake control mechanism comprising arm means fixed to the brake cross rod, a pivoted physical operable part, a casing operatively connected to rock said arm means and apply the brake mechanism against the action of the spring releasing means, said casing having three aligned separated chambers therein each open at one end to atmosphere, a fixed piston in the chamber adjacent the portion of the casing connected with the arm means, a valve movable a limited extent in the chamber at the end of the casing opposite the fixed piston chamber, means operatively connecting the valve with the physical operable part, a connection between the engine intake manifold and the valve chamber, a valve stem extending into the intermediate chamber and the fixed piston chamber, a piston in the intermediate chamber fixed on the valve stem, said valve and stem having passage means connecting the ends of the intermediate chamber and the fixed piston chamber remote from the ends open to atmosphere with the valve chamber and said valve controlling communication of its chamber with atmosphere or the intake manifold connection, and a spring in the valve chamber urging the valve into position opening the chamber to atmosphere.

11. Mechanism for actuating a motor vehicle element comprising a casing having three separated aligned chambers therein open to atmosphere, movable means in the casing forming a passage adapted to open to said three separated chambers, a fixed piston in one of the end chambers, a valve on said means movable a limited extent in the other of the end chambers, said valve having passage means therein communicating with the passage in said movable means for establishing communication between the valve chamber and the other two chambers, a reaction piston in the intermediate chamber fixed to said passage forming means and movable therewith, physically operable means connected with said passage forming means, and a suction connection communicating with the valve chambers.

PETER F. ROSSMANN.